United States Patent
Chang et al.

(10) Patent No.: US 6,535,305 B1
(45) Date of Patent: Mar. 18, 2003

(54) TRANSMISSION MECHANISM FOR OPTICAL SCANNER

(75) Inventors: Tsang-Huai Chang, Chang Hua (TW); Po-Hua Fang, Taipei (TW)

(73) Assignee: UMAX Data Systems Inc., Hsinchu (TW)

(*) Notice: Subject to any disclaimer, the term of this patent is extended or adjusted under 35 U.S.C. 154(b) by 0 days.

(21) Appl. No.: 09/481,402

(22) Filed: Jan. 12, 2000

(51) Int. Cl.[7] .................................................. H04N 1/04
(52) U.S. Cl. ........................ 358/471; 358/497; 358/474
(58) Field of Search ................... 358/497, 474, 358/494, 471, 483, 482, 400, 500, 505; 250/234, 235, 236, 208.1; 399/211, 200; 355/41, 75; 318/695, 681; 347/234, 262

(56) References Cited

U.S. PATENT DOCUMENTS

| | | | | |
|---|---|---|---|---|
| 4,651,229 A | * | 3/1987 | Coli ............................ 358/500 |
| 5,264,949 A | * | 11/1993 | Stemmle ...................... 358/474 |
| 5,467,111 A | * | 11/1995 | Furukawa et al. .......... 346/134 |
| 5,771,059 A | * | 6/1998 | Kerr et al. .................. 347/234 |
| 5,973,717 A | * | 10/1999 | Kerr et al. .................. 347/234 |
| 5,997,119 A | * | 12/1999 | Kerr ........................ 346/139 R |
| 6,049,348 A | * | 4/2000 | Spurr ......................... 347/234 |
| 6,208,368 B1 | * | 3/2001 | Kerr ........................... 347/242 |
| 6,384,897 B1 | * | 5/2002 | Tsuji ............................ 355/41 |
| 6,476,849 B1 | * | 11/2002 | Kerr ........................... 347/262 |

* cited by examiner

Primary Examiner—Cheukfan Lee
(74) Attorney, Agent, or Firm—Troxell Law Office PLLC (57) ABSTRACT

A transmission mechanism for optical scanner includes a screw bar, a first nut, a second nut, a retainer, a first spring and a second spring. The screw bar has external threads engageable with internal threads of the first and second nuts. The first nut is close to the transmission direction. The retainer is hollow and has a front and a rear wall to hold the first and second nut therebeween. The first nut makes contact with the front wall. The first spring is located between the first and second nut. The second spring has a stronger force than the first spring and is located between the second nut and the rear wall. The spring force keeps the rear side of the internal threads of the first nut make close contact with external threads of the screw bar, and the front side of the internal threads of the second nut make close contact with the external threads so that the first and second nut may be free from vibration during transmission operation.

8 Claims, 9 Drawing Sheets

TRANSMISSION MECHANISM FOR OPTICAL SCANNER

BACKGROUND OF THE INVENTION

1. Field of the Invention

This invention relates to a transmission mechanism for optical scanner and particularly to a scanner transmission mechanism that uses a screw bar to drive screw nuts to perform scanning operation.

2. Description of the Prior Art

Optical scanner is a widely used computer peripheral device which uses a chassis to capture image and a transmission mechanism to move the chassis for scanning a document.

Figure 1:
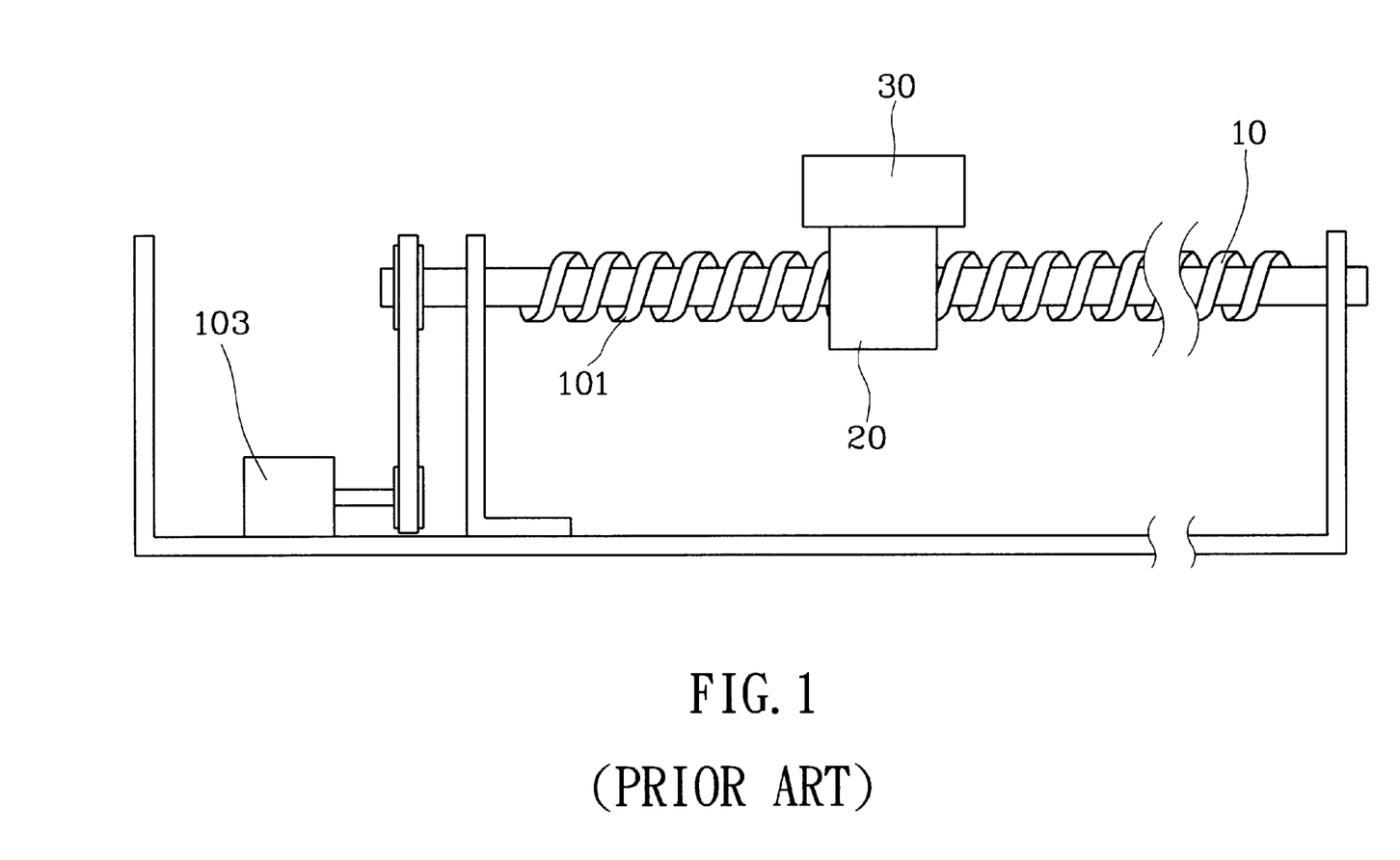
FIG. 1 is a side view of a conventional scanner transmission mechanism.

FIG. 1 illustrates a conventional scanner transmission mechanism which generally includes a screw bar 10, a nut 20 and a chassis 30 fastened to the nut 20. The screw bar 10 is an elongate bar with threads 101 formed on outside surface. One end of the screw bar 10 engages with a motor 103 which may drive the screw bar 10 to rotate when activated.

The nut 20 has a round internal opening with internal threads (not shown in the figure) formed inside and is engageable with the threads 101. When the motor 103 is activated and rotates, the screw bar 10 will be turned and moves the nut 20 linearly which in turn moves the chassis 30 reciprocally to perform scanning operation.

Figure 2:
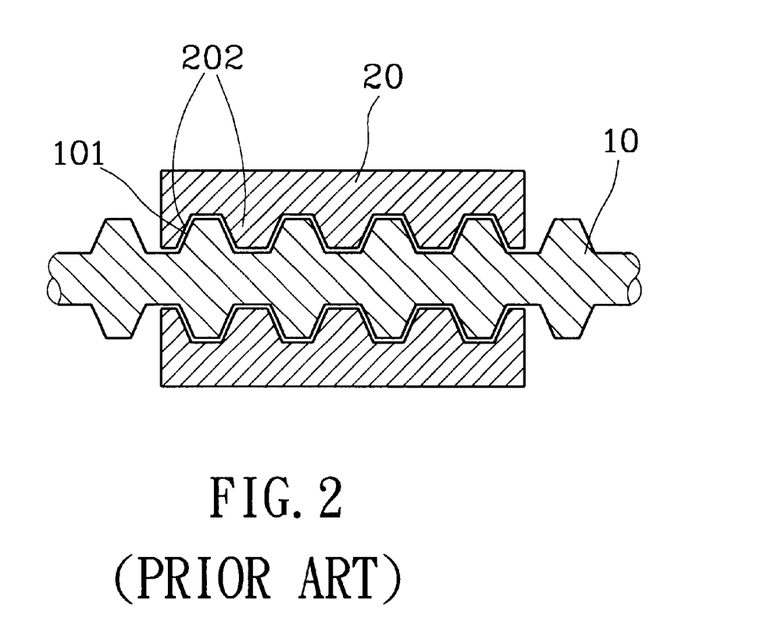
FIG. 2 is a fragmentary sectional view of a screw bar and nut of a conventional scanner transmission mechanism.

However due to machining limitation, there will be tolerance between the threads 101 and the internal threads 202 of the nut 20 (the gap between thread 101 and 202 shown in FIG. 2). This gap will cause impact and vibration between the screw 10 and nut 20 during scanning operation.

Figure 2A:
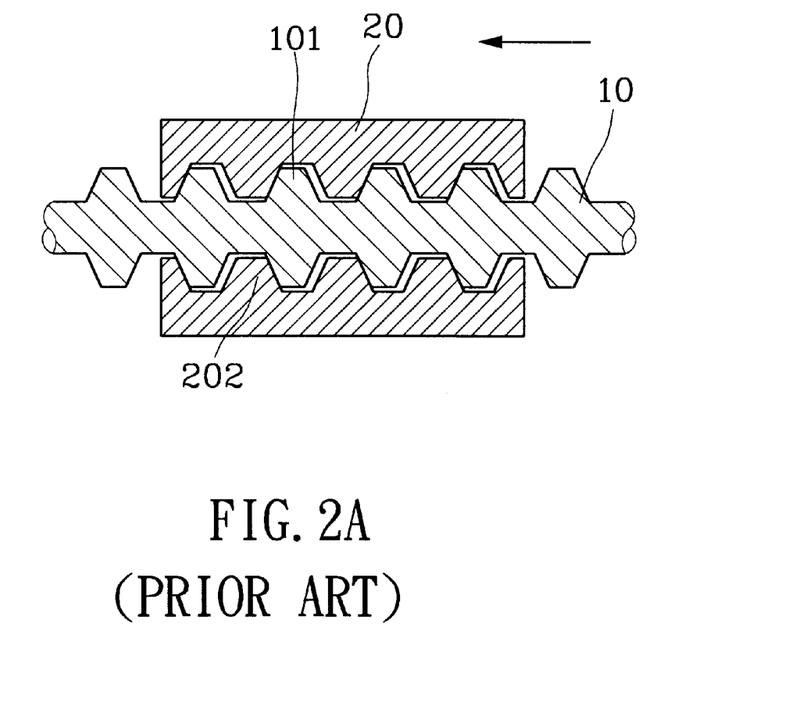
FIGS. 2A and 2B are sectional views of relative position of the screw bar and nut shown in FIG. 2, shown reciprocal vibration impact.
Figure 2B:
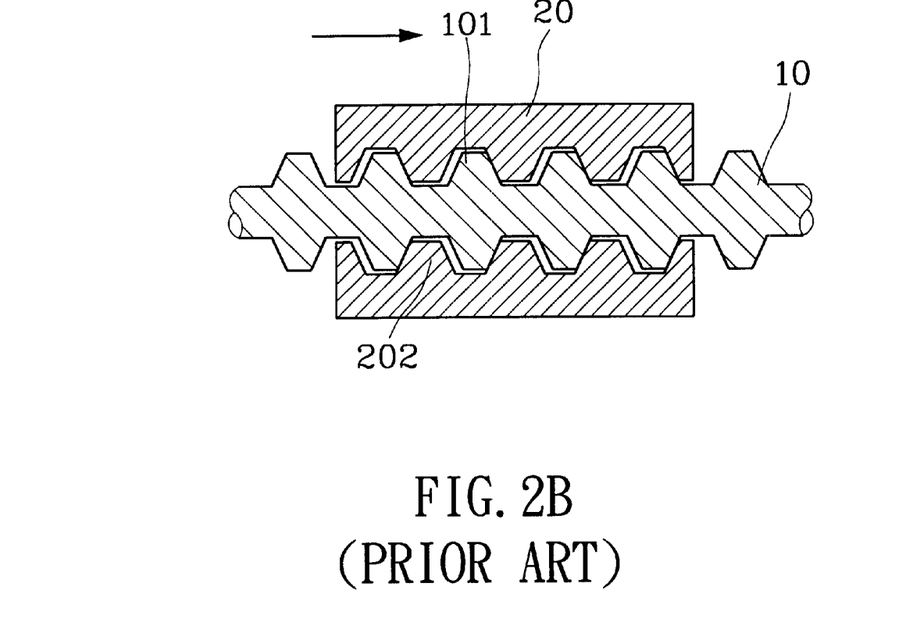
Figure 2C:
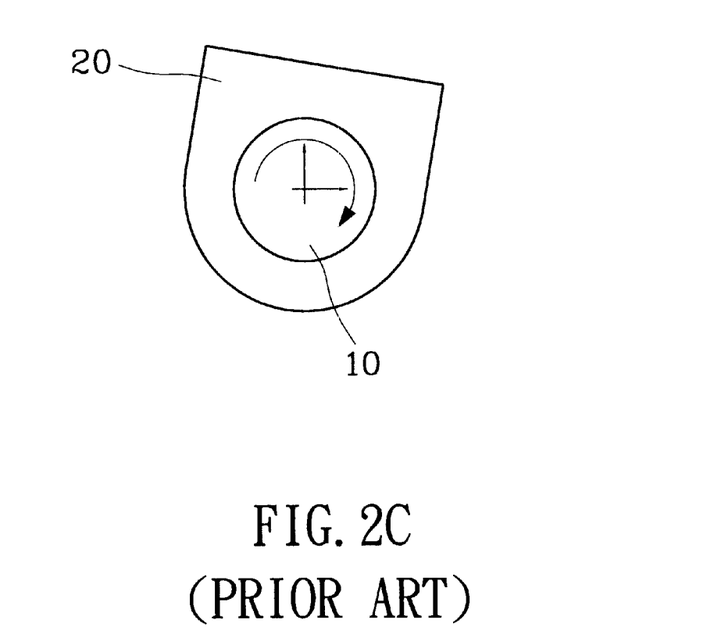
FIG. 2C is schematic end view of a nut tilting at a skew angle resulting from screw bar rotation.

For instance, when driving force is large, the screw bar 10 moves ahead and causes the front surface of the threads 202 making contact with the front surface of the threads 101 and result in a thread gap formed in the rear portion (shown in FIG. 2A). When friction resistance is large, the contact surface will take place between the rear surface of the threads 101 and 202, and result in a gap forming at the front position (shown in FIG. 2B). During scanning operation, the nut 20 will be moved reciprocally along the screw bar 20. The existence of the gap between the threads will cause vibration, which have negative impact on scanning quality and will lower scanner durability. The turning of the screw bar 10 also tends to tilt the nut 20 skew angularly (as shown in FIG. 2C) which may further down grade scanning quality. All of this begs for improvement.

SUMMARY OF THE INVENTION

It is an object of this invention to provide a transmission mechanism for scanner that does not have reciprocal vibration between the screw bar and nut for achieving higher quality scanning.

It is another object of this invention to provide a transmission mechanism for scanner that is free of vibration between the screw bar and nut for enhancing durability of the scanner.

It is a further object of this invention to provide a transmission mechanism for scanner that may prevent the nut from tilting angularly for enhancing scanning quality.

The transmission mechanism according to this invention includes a screw bar, a first nut, a second nut, a retainer, a first spring and a second spring. The screw bar is an elongate bar with threads formed on outside surface and has one end engaged with and driven by a motor for rotation. The first and second nut have internal threads engageable with the threads of the screw bar. The first nut is located between the motor and second nut.

The retainer is a hollow casing for housing the first and second nut inside. It has a front wall making contact with the first nut. The first spring is located and compressed between the first and second nut. The second spring is located and compressed between the second nut and a rear wall of the retainer. The second spring has greater spring force than the first spring. Hence the first nut is pressed with the rear surface of the internal threads making close contact with the threads of the screw bar. By the same token, the front surface of the internal threads of the second nut is making close contact with the threads of the screw bar. Therefore even when there is variation in driving or friction force in the transmission mechanism, the relative position between the first and second nut remains constant in the retainer. Vibration between the nuts and the screw bar thus may be avoided. Better scanning quality may be obtained and scanner durability may be improved. Furthermore, the retainer helps to prevent the nuts from tilting angularly which may further improve scanning quality.

BRIEF DESCRIPTION OF THE DRAWINGS

The invention, as well as its many advantages, may be further understood by the following detailed description and drawings in which.

DETAILED DESCRIPTION OF THE PREFERED EMBODIMENT

Figure 3:
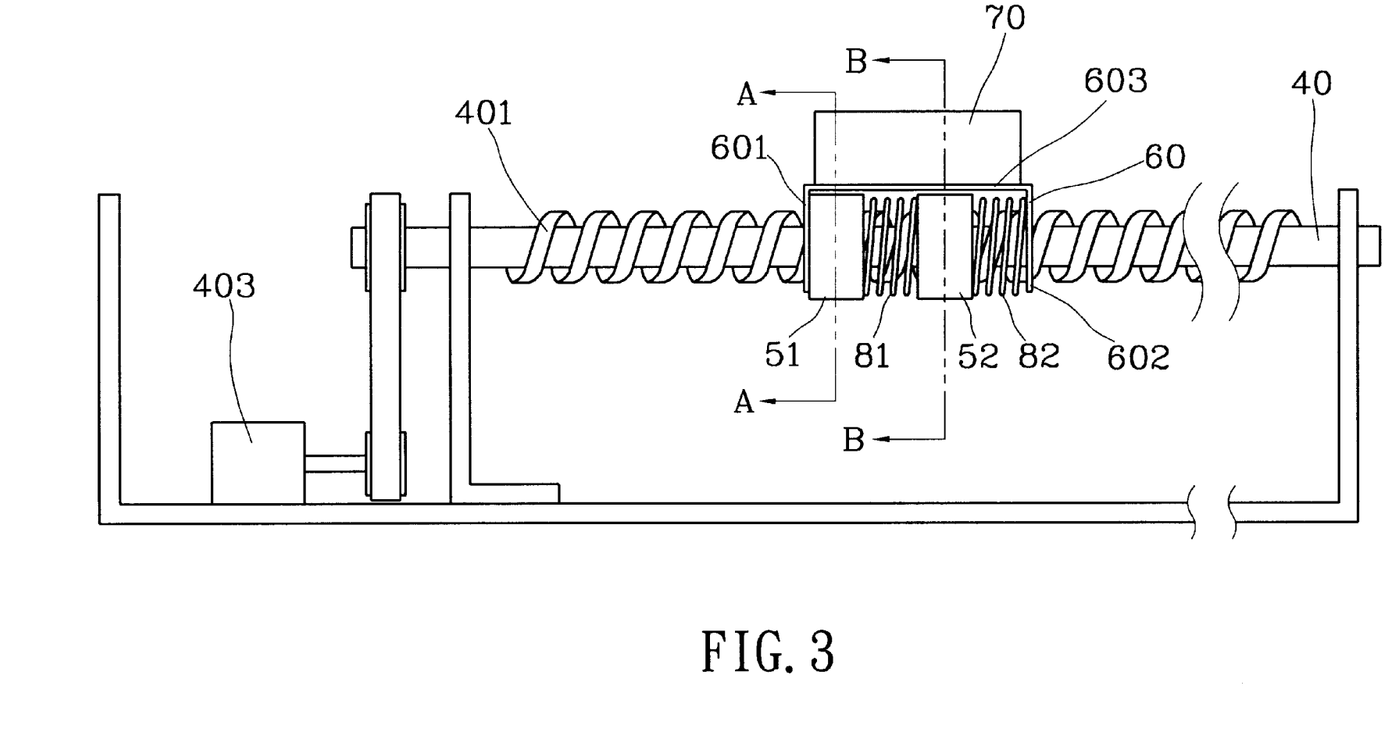
FIG. 3 is a side view of this invention.

Referring to FIG. 3, the transmission mechanism of this invention is located in the scanner for moving a chassis to perform scanning operation.

The transmission mechanism includes a screw bar 40, a first nut 51, a second nut 52, a retainer 60, a first spring 81 and a second spring 82. The screw bar 40 is an elongate bar having threads 401 formed on outside surface and having one end engaged with and driven by a motor 403.

Figure 3A:
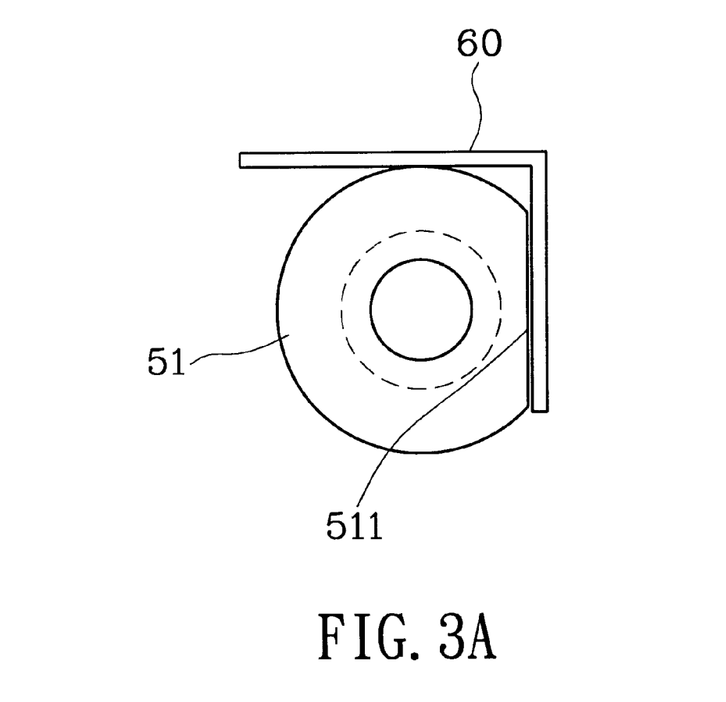
FIGS. 3A and 3B are schematic end views of the first and second nuts held in a retainer.
Figure 3B:
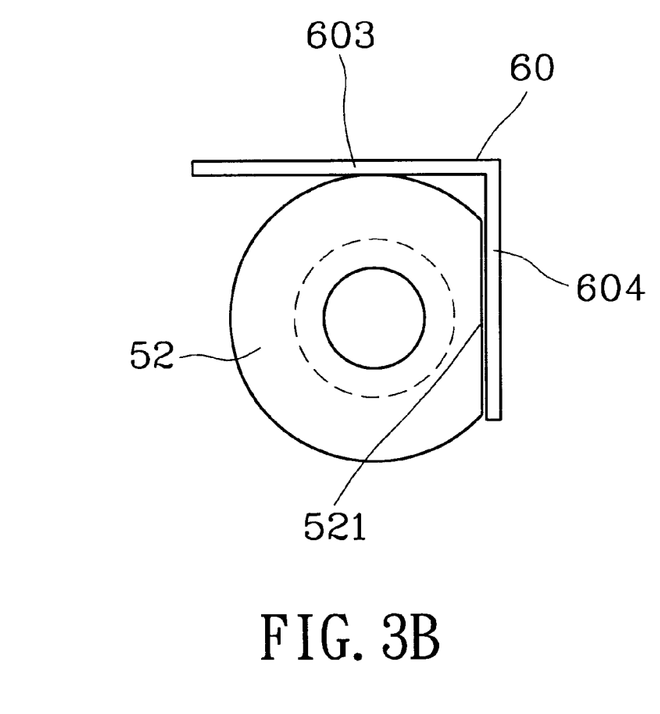

The first and second nuts 51 and 52 have internal threads (not shown in the figure) engaged with the threads 401 around the screw bar 40. Both nuts have respectively a tangent plane 511 and 521. The first nut 51 is located between the motor 403 and the second nut 52. The retainer 60 is a hollow casing having a front wall 601 making contact with one end of the first nut 51, a rear wall 602 spaced from the second nut 52, an upper wall 603 upon which a chassis 70 is mounted and a side wall 604 making contact with the tangent planes 511 and 521. The side wall 604 thus may keep the first and second nuts 51 and 52 from skewing angularly when the screw bar 40 rotates (shown in FIGS. 3A and 3B).

Figure 4A:
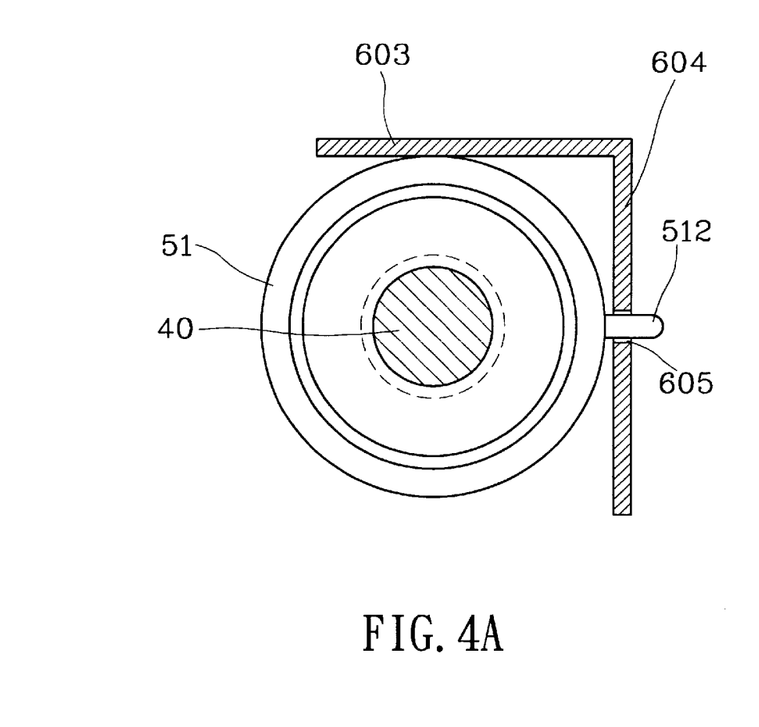
FIGS. 4A and 4B are schematic end views of another embodiment of the first and seconds nuts held in the retainer.
Figure 4B:
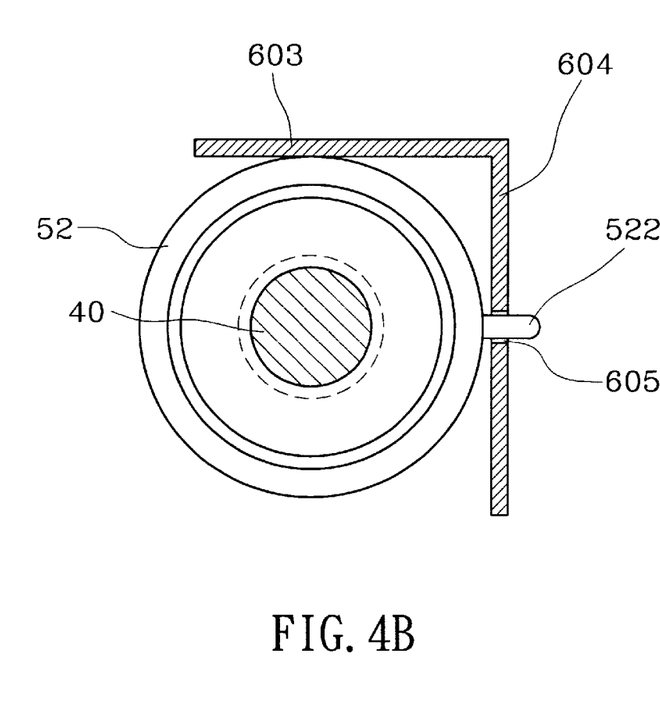

There are other means for keeping the nuts 51 and 52 from skewing angularly. FIGS. 4A and 4B show another embodiment for this purpose. Instead of tangent plane, there are latch stubs 512 and 522 attached respectively to one side of the nuts 51 and 52 for engaging with latch slots 605 formed in the side wall 604 of the retainer.

Figure 5A:
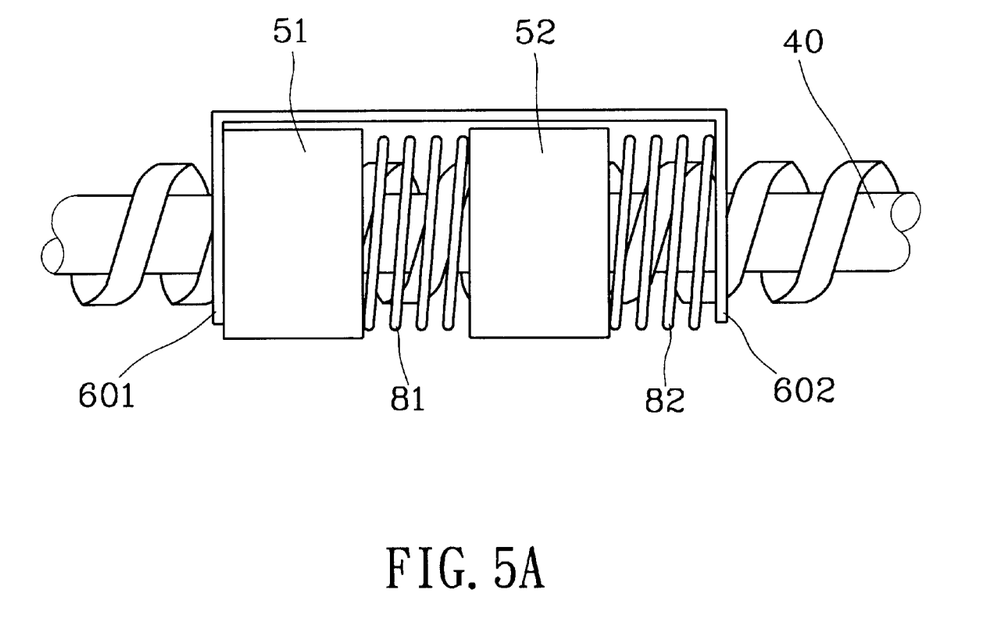
FIGS. 5A and 5B are schematic views of the first and second nuts under spring forces.
Figure 5B:
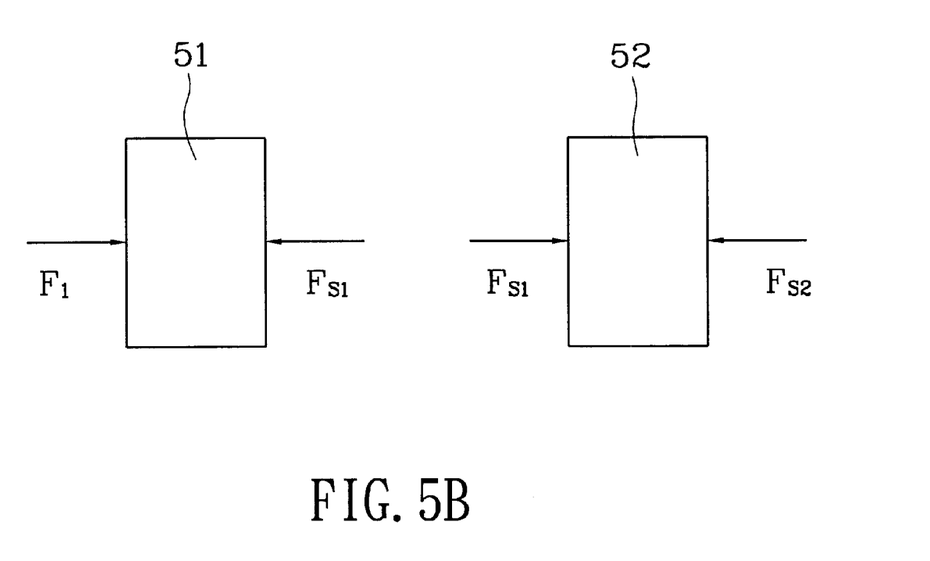
Figure 5C:
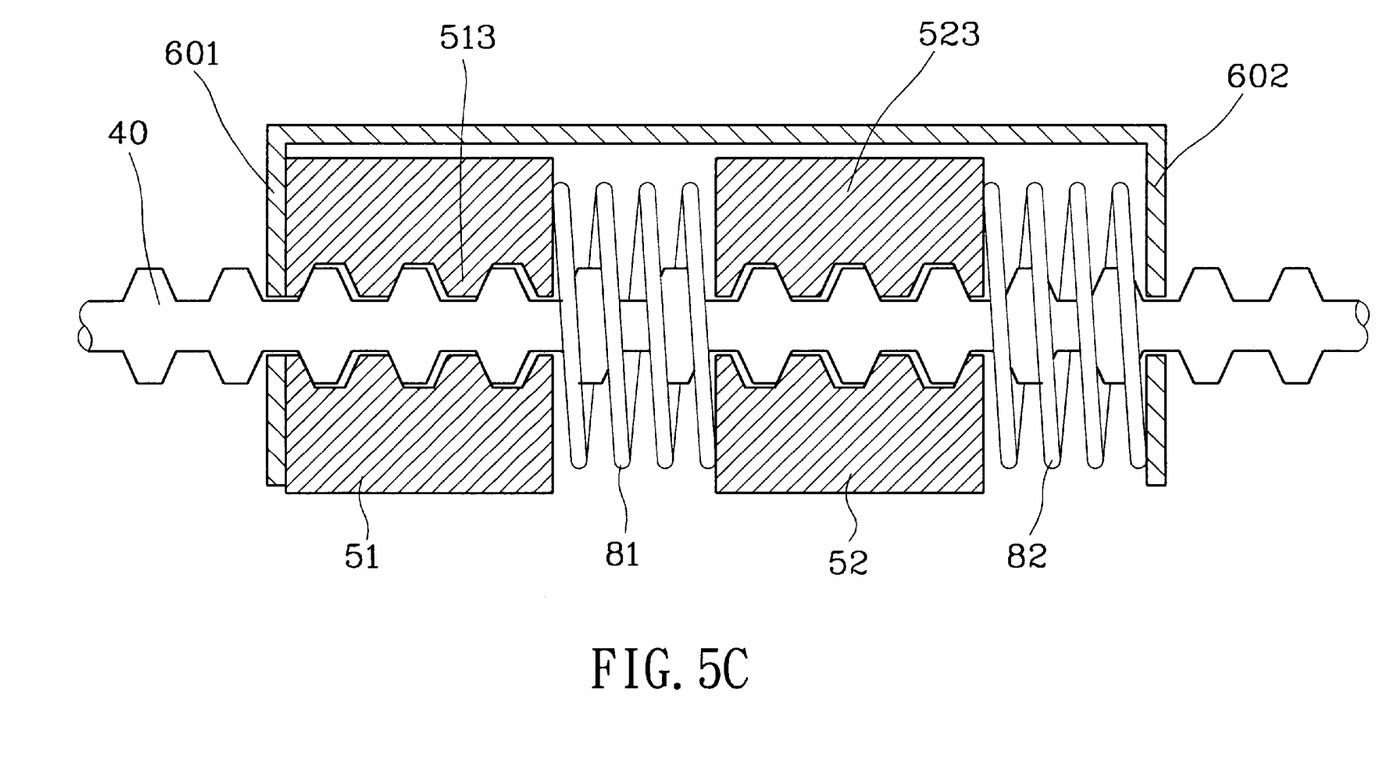
FIG. 5C is a sectional view of the first and second nuts held in a retainer.
Figure 6:
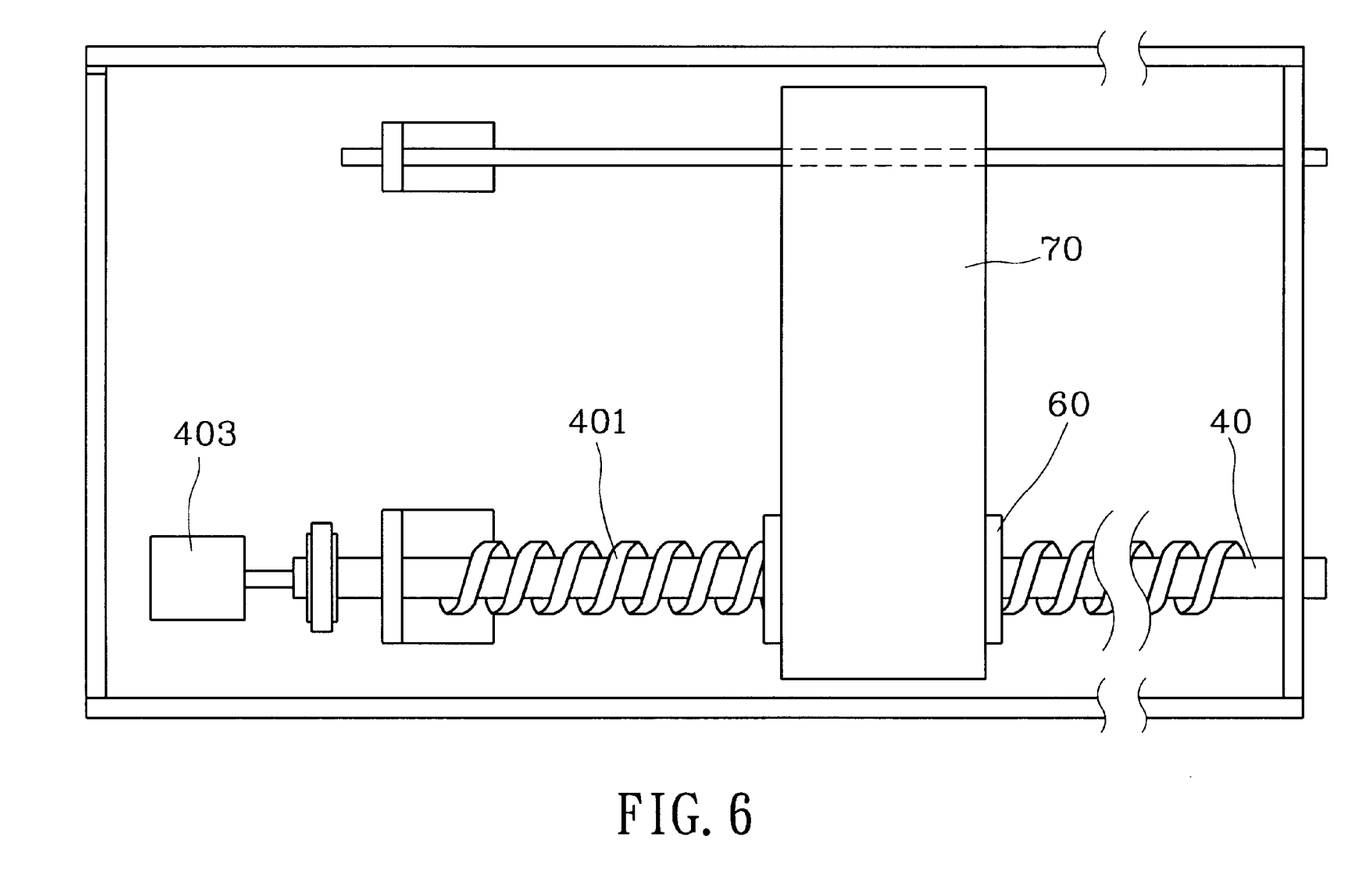
FIG. 6 is a top view of this invention engaged with a chassis.

Referring to FIGS. 3 and 5, the first compressed spring 81 is located between the first and second nuts 51 and 52, and the second compressed spring 82 is located between the second nuts 52 and the rear wall 602. The second spring 82 has stronger force than the first spring 81.

Referring to FIGS. 5A, 5B and 5C, $F_1=F_{s2}$, where $F_1$ is the reaction force of the front wall 601, $F_{s1}$ is the spring force of the first spring 81 which is smaller than the spring force $F_{s2}$ of the second spring 82. As a result, the first nut 51 is pushed forward so that the rear side of the internal threads 513 of the first nut 51 make contact with the threads 401 (with a gap formed at a front side) while the front side of the internal threads 523 (of the second nut 52) make contact with the threads 401 (with a gap formed at a rear side).

Because of such structure, the first and second springs 81 and 82 keep the first and second nuts 51 and 52 held in the retainer 602 with closed forced contact against the threads 401 of the screw bar 40. The reciprocal vibration resulting form gap between the nut and the screw bar thus may be prevented even when there is vibration in driving or friction force. Hence better scanning quality may be obtained and longer scanner durability may be achieved.

As an embodiment variation, the spring force of the first spring 81 may be greater than the second spring 82. In such case, the gap will be formed at a rear side of the first nut 81 and at a front side of the second nut 82. When the screw bar 40 drives the first nut 51, the first nut 51 will be moved forward to close the gap first before moving the transmission means forward. A vibration will happen. It will result in poor stability. Hence to have a stronger second spring 82 is a preferred embodiment.

It may thus be seen that the object of the present invention set forth herein, as well as those made apparent from the foregoing description, are efficiently attained. While the preferred embodiment of the invention has been set forth for purpose of discourse, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An transmission mechanism for optical scanner, comprising:

an enalogate rotationable screw bar having threads formed on outside surface thereof;

a first nut having internal threads formed in an internal round opening engageable with the threads of the screw bar;

a second nut having internal threads formed in an internal round opening engageable with the threads of the screw bar, the second nut being spaced from the first nut and being remote from the transmission direction;

a hollow retainer having a front wall and a rear wall for holding the first and second nut therebetween, the front wall being contact with the first nut;

a first compressed spring located between the first and second nut; and a second compressed spring located between the second nut and the rear wall;

wherein the second spring has stronger force than the first spring such that a rear surface of the internal threads of the first nut make close contact with the threads of the screw bar, and a front surface of the internal threads of the second nut make close contact with the threads of the screw bar.

2. The transmission mechanism for optical scanner of claim 1, wherein the first and second nut have respectively a tangent plane making contact with a side wall of the retainer for preventing the first and second nut from skewing angularly when the screw bar rotates.

3. The transmission mechanism for optical scanner of claim 1, wherein the first and second nut have respectively a latch stub located on a lateral side engageable with a latch slot formed respectively in a side wall of the retainer for preventing the first and second nut from skewing angularly when the screw bar rotates.

4. The transmission mechanism for optical scanner of claim 1, wherein the scanner includes a chassis mounted on an upper wall of the retainer.

5. The transmission mechanism for optical scanner of claim 4, wherein the chassis is fastened to the upper wall by means of screws.

6. The transmission mechanism for optical scanner of claim 1, wherein the screw bar has one end engaged with and driven to rotates by a motor.

7. The transmission mechanism for optical scanner of claim 1, wherein a gap is formed in front of the internal threads when the rear side of the internal threads of the first nut making contact with the threads of the screw bar.

8. The transmission mechanism for optical scanner of claim 1, wherein a gap is formed behind the internal threads when the front side of the internal threads of the second nut making contact with the threads of the screw bar.

* * * * *